United States Patent
Ogata

(10) Patent No.: US 9,948,825 B2
(45) Date of Patent: Apr. 17, 2018

(54) PROCESSING APPARATUS THAT CAN BE TRANSITIONED INTO AN ENABLED STATE

(71) Applicant: FUJI XEROX CO., LTD., Tokyo (JP)

(72) Inventor: Kenta Ogata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 71 days.

(21) Appl. No.: 14/219,572

(22) Filed: Mar. 19, 2014

(65) Prior Publication Data

US 2015/0077775 A1  Mar. 19, 2015

(30) Foreign Application Priority Data

Sep. 19, 2013 (JP) ................................. 2013-193889

(51) Int. Cl.
*G06K 9/00* (2006.01)
*H04N 1/44* (2006.01)

(52) U.S. Cl.
CPC .......... *H04N 1/4406* (2013.01); *H04N 1/442* (2013.01); *H04N 1/4433* (2013.01); *G06K 9/00281* (2013.01); *G06K 9/00288* (2013.01)

(58) Field of Classification Search
CPC .......... H04N 1/00342; H04N 1/00519; H04N 1/00896; H04N 2201/0094; H04N 2201/0098; H04N 5/2256; H04N 5/332; H04N 1/4406; H04N 1/442; H04N 1/4433; H04N 5/2254; H04N 5/2257; G06K 9/00355; G06K 9/209; G03G 15/5004; G06F 1/3231; G06F 3/017; Y02B 60/1289; G02B 7/20

(Continued)

(56) References Cited

U.S. PATENT DOCUMENTS 6,918,673 B2 * 7/2005 Johnson ................... G02B 5/20
                                                 359/590
8,457,701 B2 * 6/2013 Diebel ................. H04B 1/3888
                                                 206/701

(Continued)

FOREIGN PATENT DOCUMENTS

JP         A-5-45471      2/1993
JP        A-2007-279603   10/2007

OTHER PUBLICATIONS

English Machine Translation of JP 2009-071631-A (Sugino, Published Apr. 2, 2009).*

*Primary Examiner* — Benny Q Tieu
*Assistant Examiner* — Juan M Guillermety
(74) *Attorney, Agent, or Firm* — Oliff PLC

(57) ABSTRACT

Provided is a processing apparatus that receives an operation and executes a process according to the operation, the processing apparatus including a housing that is provided with an opening facing a forward direction, a camera that causes a lens to be looked from the opening to generate a captured image, a filter that extends over a front surface of the lens and is placed with interposing a reflection reducing material between the filter and the housing, and a control unit that analyzes a human within an angle of a view of image capturing based on the captured image generated by the camera, using analysis results as one basis determines whether to cause the processing apparatus to transition to an enabled state, and causes the processing apparatus to transition to an enabled state when the determination of the transition to an enabled state is made.

6 Claims, 13 Drawing Sheets

(58) Field of Classification Search
USPC ......... 358/1.14, 1.13; 348/207, 333.01, 340; 359/590, 601
See application file for complete search history.

(56) References Cited

U.S. PATENT DOCUMENTS

| | | | |
|---|---|---|---|
| 2006/0044450 A1* | 3/2006 | Wolterink | H04N 5/2254 348/340 |
| 2010/0053759 A1* | 3/2010 | Inoue et al. | 359/601 |
| 2011/0109937 A1* | 5/2011 | Fujiki | H04N 1/00885 358/1.15 |
| 2012/0081792 A1* | 4/2012 | Neuffer | G02B 1/041 359/601 |
| 2012/0082924 A1* | 4/2012 | Kominato et al. | 430/5 |
| 2012/0105400 A1* | 5/2012 | Mathew | H04N 5/2254 345/207 |
| 2012/0127518 A1* | 5/2012 | Ogata et al. | 358/1.15 |
| 2012/0315018 A1* | 12/2012 | Gohshi et al. | 386/254 |
| 2013/0120779 A1* | 5/2013 | Baba et al. | 358/1.13 |
| 2013/0293722 A1* | 11/2013 | Chen | 348/164 |
| 2014/0092417 A1* | 4/2014 | Kuroishi et al. | 358/1.14 |
| 2014/0104630 A1* | 4/2014 | Baba | H04N 1/00323 358/1.13 |
| 2015/0241603 A1* | 8/2015 | Fujii | G02B 1/11 359/601 |

* cited by examiner

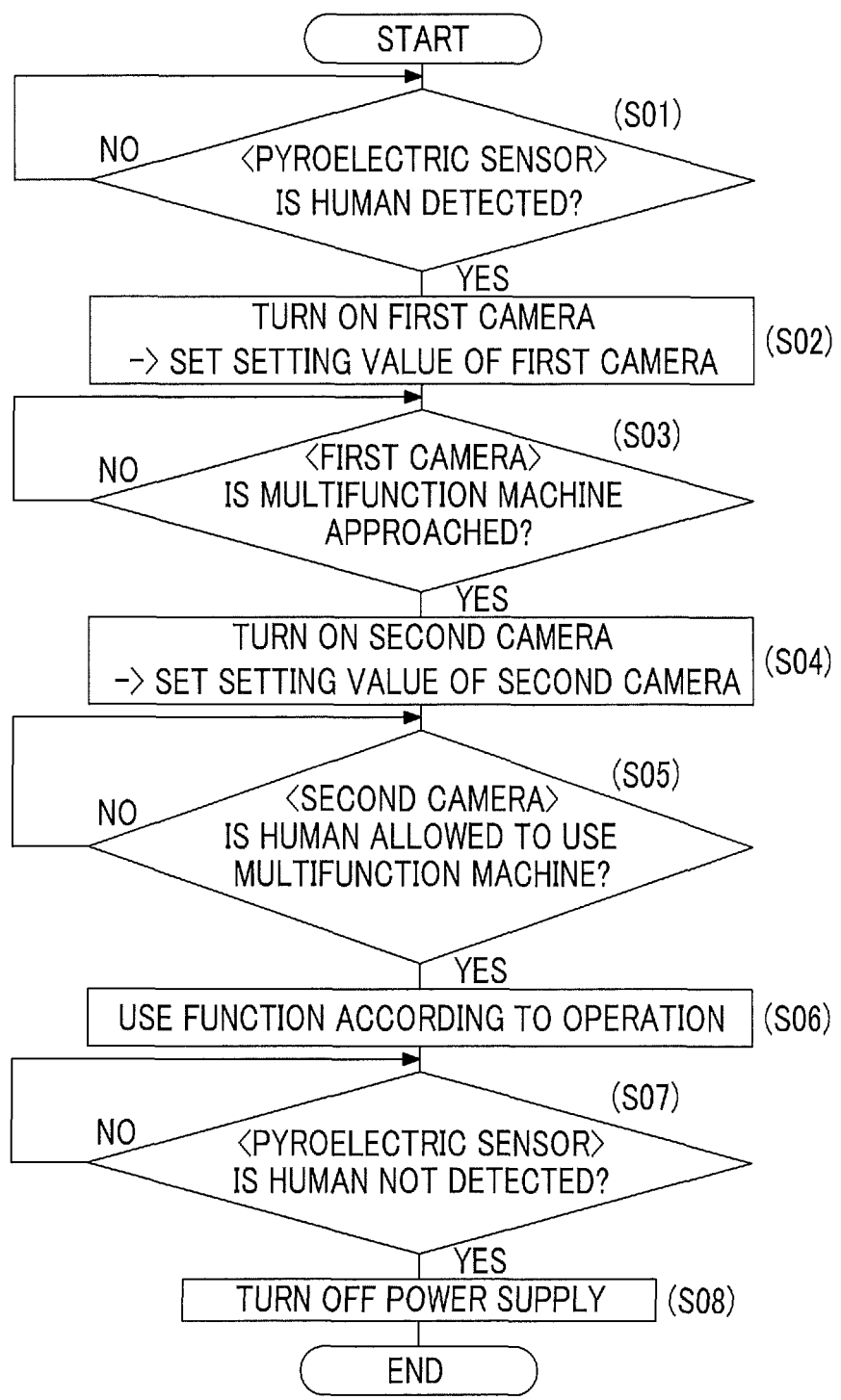

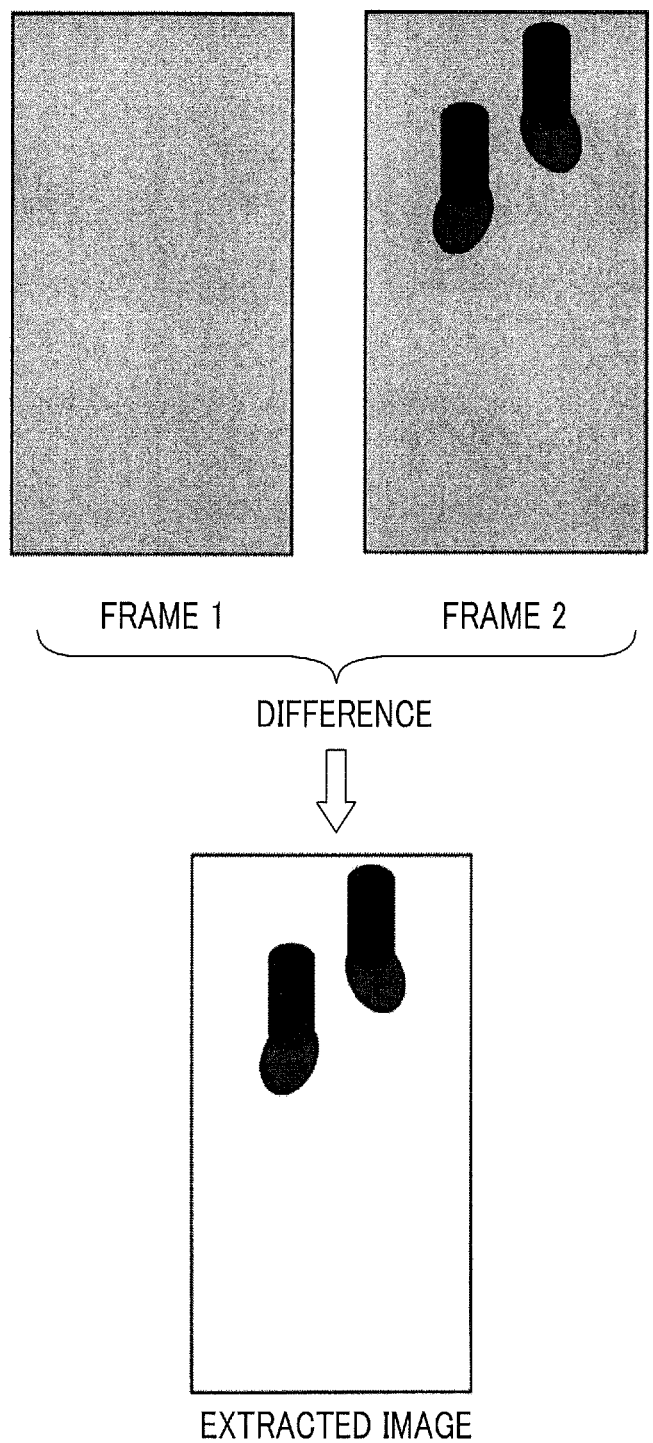

EXTRACTED IMAGE

TIME-SERIES

DETECT MOVEMENT

TOE ANGLE

TRAJECTORY OF FEET

MOVING METHOD

PROCESSING APPARATUS THAT CAN BE TRANSITIONED INTO AN ENABLED STATE

CROSS-REFERENCE TO RELATED APPLICATIONS

This application is based on and claims priority under 35 USC 119 from Japanese Patent Application No. 2013-193889 filed Sep. 19, 2013.

BACKGROUND (i) Technical Field

The present invention relates to a processing apparatus.

(ii) Related Art

There are known various processing apparatuses such as an image forming apparatus processing an image to form the image on a sheet or a facsimile machine reading an image on an original document to perform facsimile transmission.

SUMMARY

According to an aspect of the invention, there is provided a processing apparatus that receives an operation and executes a process according to the operation, the processing apparatus including:

a housing that is provided with an opening facing a forward direction;

a camera that causes a lens to be looked from the opening to generate a captured image;

a filter, for preventing a contact with the lens, that extends over a front surface of the lens and is placed with interposing a reflection reducing material between the filter and the housing; and a control unit that analyzes a human within an angle of a view of image capturing based on the captured image generated by the camera, using analysis results as one basis determines whether to cause the processing apparatus to transition to an enabled state, and causes the processing apparatus to transition to an enabled state when the determination of the transition to an enabled state is made.

BRIEF DESCRIPTION OF THE DRAWINGS

Exemplary embodiments of the present invention will be described in detail based on the following figures, wherein:

FIG. 4 is a flowchart illustrating a summary of a process in the main controller;

FIG. 5 is an explanatory diagram of an image extraction process in a first camera;

DETAILED DESCRIPTION

Hereinafter, an exemplary embodiment of the present invention will be described.

Figure 1A:
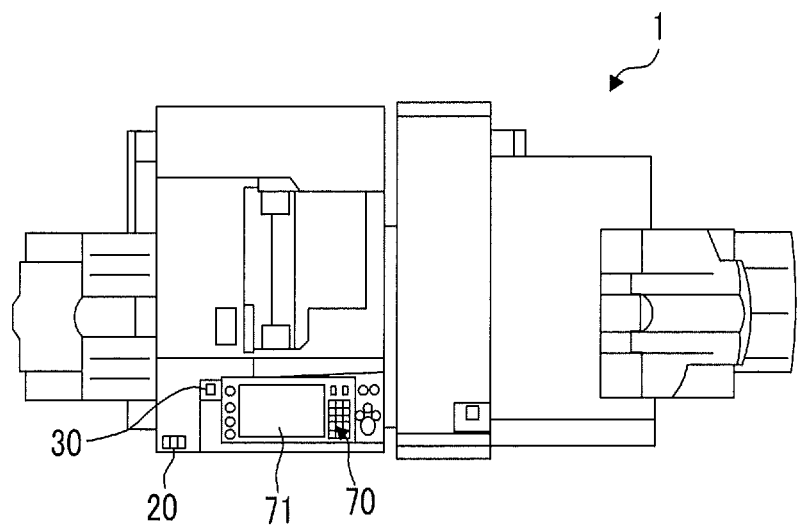
FIGS. 1A and 1B are diagrams illustrating a contour of a multifunction machine which is an exemplary embodiment of a processing apparatus according to the present invention.
Figure 1B:
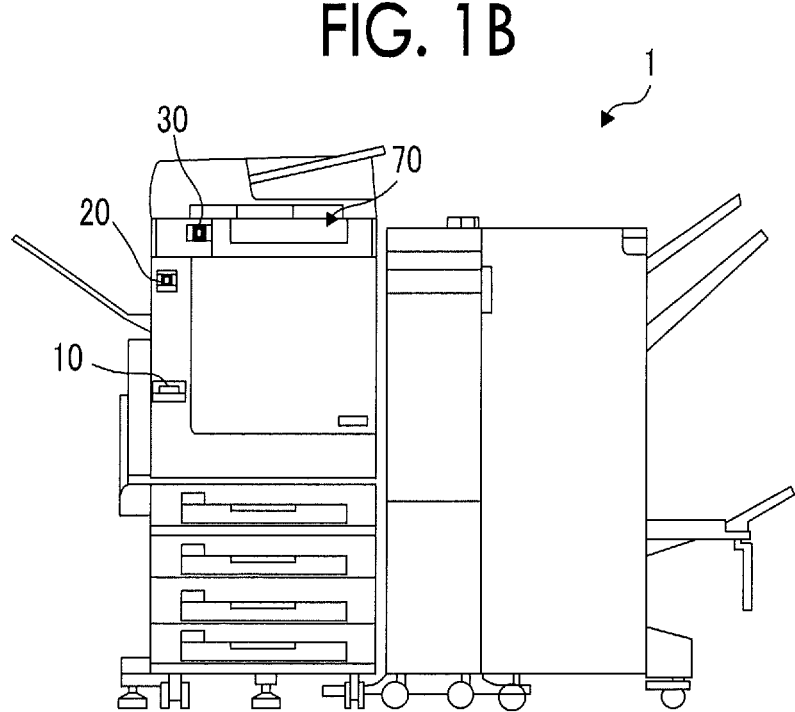

FIGS. 1A and 1B are diagrams illustrating a contour of a multifunction machine which is an exemplary embodiment of a processing apparatus according to the present invention. FIG. 1A is a plan view, and FIG. 1B is a front view.

A multifunction machine 1 includes a pyroelectric sensor 10, a first camera 20, and a second camera 30.

The pyroelectric sensor 10 is a sensor that detects infrared rays by a pyroelectric effect. Herein, approach of a human to the multifunction machine 1 is detected by the pyroelectric sensor 10.

The first camera 20 corresponds to an example of a camera described in the present invention. The first camera 20 is a camera that captures an image of the front of the multifunction machine 1, and includes a fisheye lens, and thus has a wide angle of a view of image capturing. A distance to a human in the vicinity of the multifunction machine 1 and a moving direction of the human are detected, based on image data which is obtained by image capturing using the first camera 20. Specifically, the human is recognized from above the captured image, and the human's foot (a portion of a foot or shoe) is extracted, and thus the distance to the human is measured by the position of the foot within the angle of the view of image capturing, and the moving direction is detected by a direction of a toe or a time-series movement of the foot. The distance to the human and the moving direction of the human are detected, and thus it is determined whether the human merely passes in the vicinity of the multifunction machine 1 or attempts to use the multifunction machine 1.

In the multifunction machine 1, the distance to the human within the angle of a view of image capturing and the moving direction of the human are analyzed based on the captured image generated by the first camera 20 in a main controller 90 (see FIG. 2 and FIG. 3) which is to be described later, and as one of the analysis results, it is determined whether to cause the multifunction machine 1 to transition to an enabled state. When the determination of the transition to an enabled state is made, a control of causing the multifunction machine to transition to an enabled state is performed. The details thereof will be described later.

The second camera 30 is a camera facing a forward and obliquely upward direction of the multifunction machine 1. It is determined whether a human in the vicinity of a distance (an operation distance, for example, 350 mm) which is suitable for the operation of the multifunction machine 1 is a human authorized to use the multifunction machine 1, based on image data obtained by the image capturing using the second camera 30. Based on this function, it is possible to allow only a human having the authority to use the multifunction machine 1 to use the multifunction machine 1.

In addition, FIGS. 1A and 1B illustrate a user interface 70. The user interface 70 includes an operator which is operated by a user of the multifunction machine 1 to take on a role in transmitting a user's instruction to the multifunction machine 1. In addition, the user interface 70 includes a display unit 71. The display unit 71 displays various pieces of information such as a state of the multifunction machine 1 or a message to a user. In addition, the display unit 71 displays a user's face which is captured by the second camera 30. Furthermore, the display unit 71 may also display an image captured by the first camera 20 in accordance with an operation.

Figure 2:
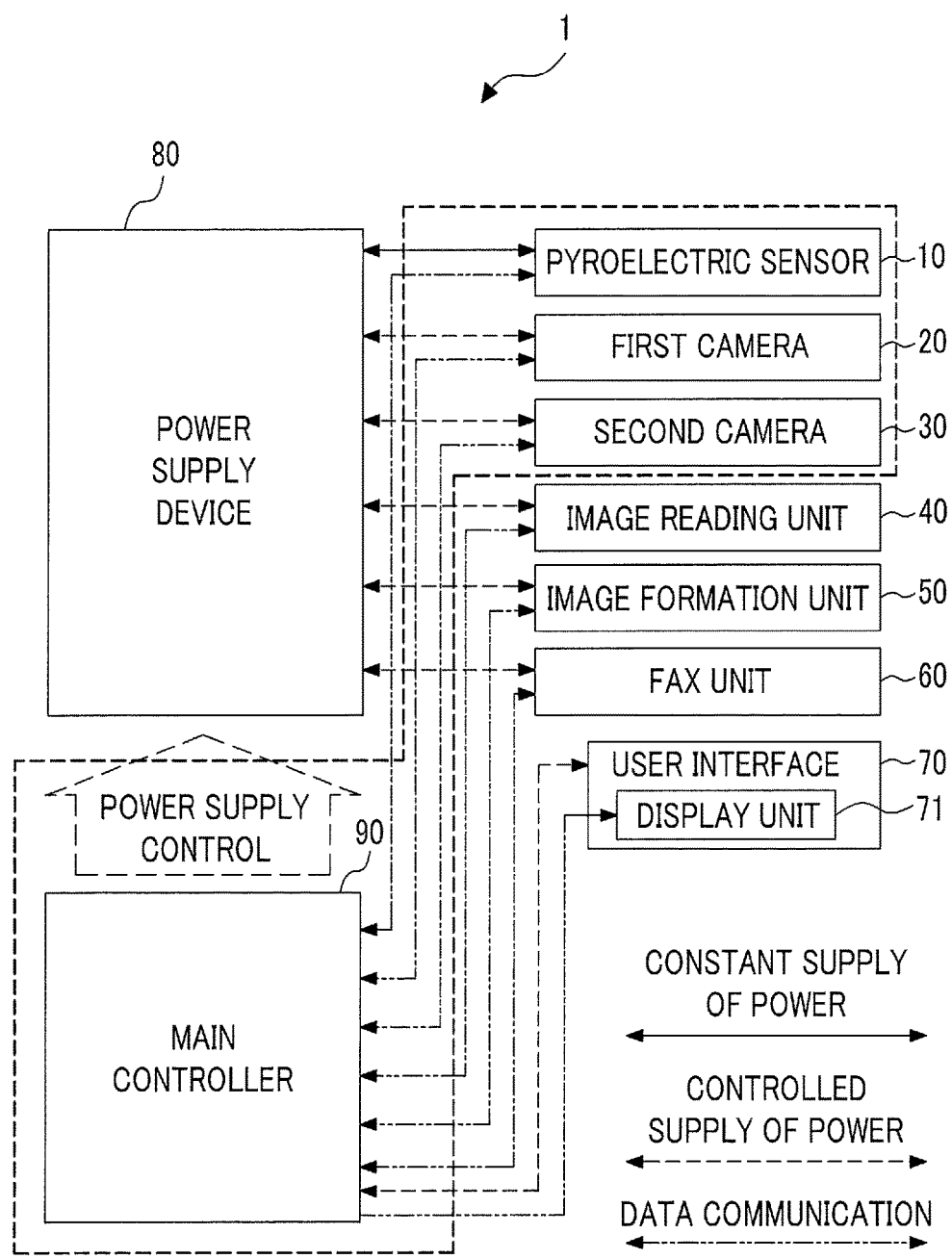
FIG. 2 is a functional block diagram of the multifunction machine illustrated in FIGS. 1A and 1B.

FIG. 2 is a functional block diagram illustrating a contour of the multifunction machine illustrated in FIGS. 1A and 1B.

The multifunction machine 1 includes not only the pyroelectric sensor 10, the first camera 20, the second camera 30, and the user interface 70 which are described above with reference to FIGS. 1A and 1B, but also an image reading unit 40, an image formation unit 50, and a FAX unit 60.

The image reading unit 40 has a function of reading an image recorded in an original document to generate image data indicating the image.

In addition, the image formation unit 50 has a function of forming an image based on the image data, on a sheet. An electrophotographic printer is suitable as the image formation unit 50. However, the image formation unit is not required to be an electrophotographic type image formation unit, and may be a type that forms an image on a sheet using other methods, for example, using an inkjet printer. Here, the image formation unit 50 is responsible not only for forming an image based on the image data generated by the image reading unit 40 but also for forming an image based on image data received by the FAX unit 60 which will be described below.

The FAX unit 60 is connected to a telephone line (not shown), and takes on a function of transmitting and receiving a facsimile. In a case of the transmission of the facsimile, the image reading unit 40 reads an original document to generate image data for facsimile transmission, and the image data is transmitted from the FAX unit 60. In addition, in a case of the reception of the facsimile, the FAX unit 60 receives the image data, and an image based on the image data is formed on a sheet by the image formation unit 50.

In addition, the multifunction machine 1 further includes the user interface 70, a power supply device 80, and the main controller 90.

The power supply device 80 is controlled by the main controller 90 to take on a role in supplying power to members from the pyroelectric sensor 10 to the user interface 70, and all components requiring power in the multifunction machine 1.

The main controller 90 performs the control of the entire multifunction machine 1 such as the control of the pyroelectric sensor 10 to the FAX unit 60, the control of a display of the display unit 71 included in the user interface 70, and the control of the power supply device 80. In addition, the main controller 90 is also responsible for data communication with components, from the pyroelectric sensor 10 to the user interface 70, and for various data processing.

Figure 3:
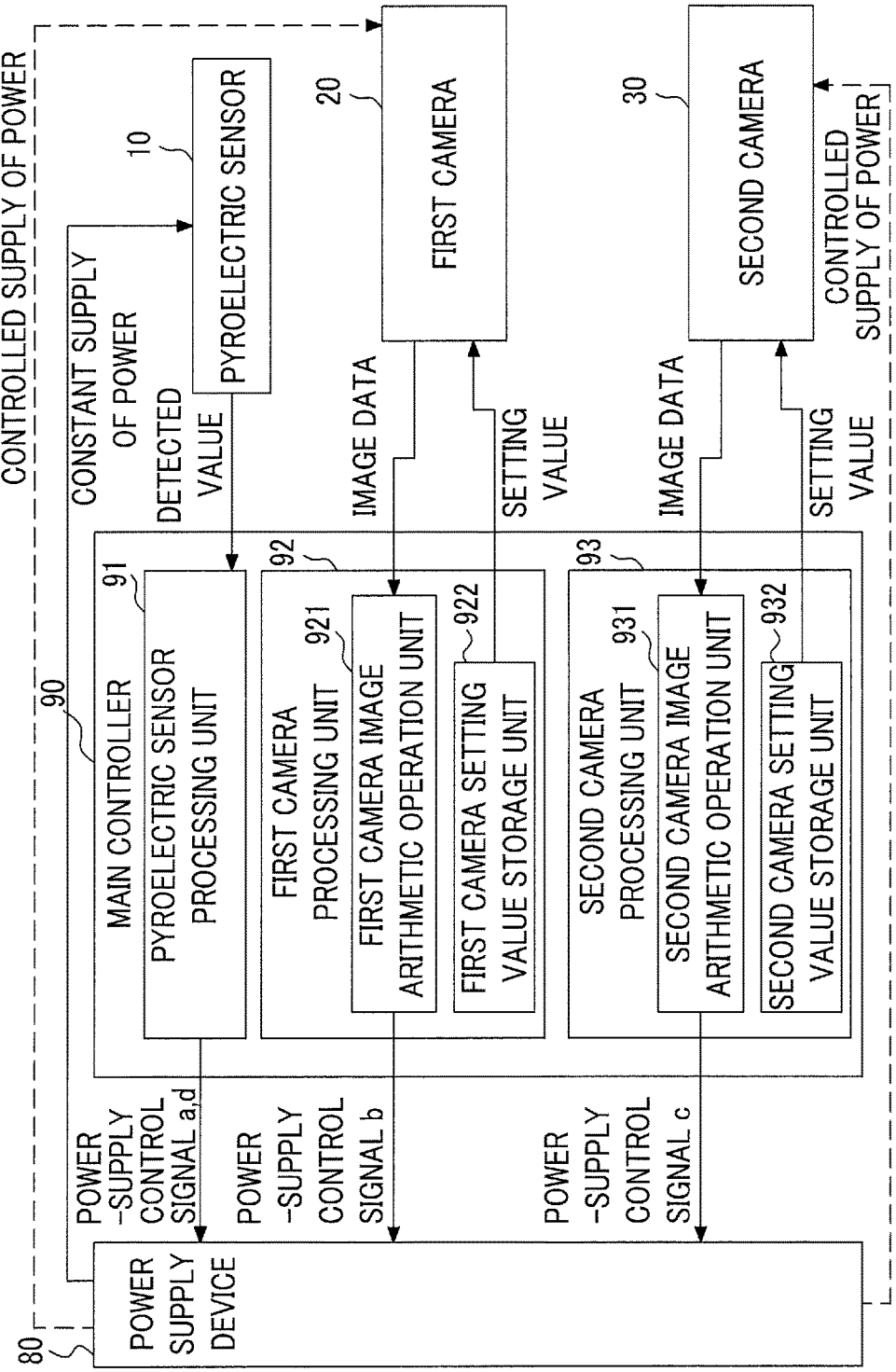
FIG. 3 is a block diagram illustrating an internal structure of a main controller.

FIG. 3 is a block diagram illustrating an internal structure of the main controller. Herein, a portion surrounded by a dotted line in FIG. 2, that is, only blocks with regard to the control of the pyroelectric sensor 10, the first camera 20, and the second camera 30, are illustrated.

Herein, a pyroelectric sensor processing unit 91, a first camera processing unit 92, and a second camera processing unit 93 are shown as components of the main controller 90. The first camera processing unit 92 includes a first camera image arithmetic operation unit 921 and a first camera setting value storage unit 922. In addition, similarly, the second camera processing unit 93 includes a second camera image arithmetic operation unit 931 and a second camera setting value storage unit 932. The first camera 20 and the second camera 30 perform various pieces of image processing on an image signal obtained by image capturing. The first camera setting value storage unit 922 and the second camera setting value storage unit 932 store setting values in advance for regulating processing levels or the like of pieces of image processing which are performed in the first camera 20 and the second camera 30, respectively. The setting values stored in the first camera setting value storage unit 922 and the second camera setting value storage unit 932 are set in the first camera 20 and the second camera 30, respectively, at the start of respective operations of the first camera 20 and the second camera 30. The first camera 20 and the second camera 30 perform image processing based on the setting value which is set at the start of operation, on the image signal obtained by image capturing. The first camera 20 and the second camera 30 perform various types of image processing, and the first camera setting value storage unit 922 and the second camera setting value storage unit 932 store various setting values corresponding to these various types of image processing. These various setting values are set in the first camera 20 and the second camera 30 at the start of respective operations of the first camera 20 and the second camera 30. The first camera setting value storage unit 922 and the second camera setting value storage unit 932 are rewritable storage units, and basically store setting values suitable for the multifunction machine 1 in accordance with an installation environment of the multifunction machine 1 or a user's selection, at the time of the installation of the multifunction machine 1.

FIG. 4 is a flow chart illustrating a summary of a process in the main controller.

In an initial state, the components from the first camera 20 to the user interface 70 illustrated in FIG. 2 are not supplied with power, and are stopped.

A detected value of the pyroelectric sensor 10 is input to the pyroelectric sensor processing unit 91 of the main controller 90. The pyroelectric sensor processing unit 91 determines whether a human approaches the multifunction machine 1, based on the input detected value (step S01). However, at this time, it is not possible to distinguish whether a human approaches or whether an animal such as a dog or a cat approaches, and it merely determines whether infrared rays are detected by the pyroelectric sensor 10. However, the pyroelectric sensor 10 is for the purpose of detecting approach of a human, and a description will be given below on the assumption that a human approaches.

When the approach of a human to the multifunction machine 1 is detected in the pyroelectric sensor processing unit 91, a power-supply control signal a (see FIG. 3) is transmitted to the power supply device 80. When the power supply device 80 receives a power-supply control signal a indicating that the approach of a human is detected in the pyroelectric sensor 10, the power supply device supplies power to the first camera 20 in turn.

Subsequently, the main controller 90 sets the setting value stored in the first camera setting value storage unit 922 in the first camera 20 (FIG. 4, step S02). Thus, the first camera 20 starts image capturing, and further executes image processing according to the set setting value to generate digital image data.

The image data generated in the first camera 20 is input to the first camera image arithmetic operation unit 921 of the first camera processing unit 92 of the main controller 90. As will be described later, the first camera image arithmetic operation unit 921 recognizes a distance to a human at a position close to the multifunction machine 1 and a moving direction of the human, based on the input image data. Then, in a situation where it is determined that the human attempts to use the multifunction machine 1 (FIG. 4, step S03) in light of the distance to the human and the moving direction of the human, the first camera image arithmetic operation unit 921 outputs a power-supply control signal b to the power supply device 80. When the power supply device 80 receives the power-supply control signal b, the power supply device 80 supplies power to the second camera 30 this time.

Subsequently, the main controller 90 sets the setting value stored in the second camera setting value storage unit 932 in the second camera 30 (FIG. 4, step S04). Thus, the second camera 30 starts image capturing and performs image processing according to the set setting value to generate digital image data. The generated image data is input to the second camera image arithmetic operation unit 931 of the second camera processing unit 93 of the main controller 90. As will be described later, the second camera image arithmetic operation unit 931 determines whether a human located in the vicinity of a substantially operation distance (for example, 350 mm) of the multifunction machine 1 is a human having the authority to use the multifunction machine 1, based on the input image data. Specifically, it is determined whether the human is a human registered in advance as a human having the authority to use the multifunction machine 1 or is anyone else (FIG. 4, step S05). When the second camera image arithmetic operation unit 931 determines that the human is a human having the authority to use the multifunction machine 1, a power-supply control signal c is output from the second camera image arithmetic operation unit 931 to the power supply device 80. When the power supply device 80 receives the power-supply control signal c, the power supply device supplies power, this time, to the image reading unit 40, the image formation unit 50, the FAX unit 60, and the user interface 70, which are illustrated in FIG. 2. Thus, the multifunction machine 1 is set to be in an enabled state, and thus a function based on an operation, for example, a copying function or a FAX function, works (FIG. 4, step S06).

When it is detected that a human is separated from the multifunction machine 1, using the detected value of the pyroelectric sensor 10 (FIG. 4, step S07), a power-supply control signal d indicating the separation of the human is output toward the power supply device 80 from the pyroelectric sensor processing unit 91. Then, the power supply device 80 stops supplying power to the first camera 20 to the user interface 70 except for to the pyroelectric sensor 10 (step S08).

FIG. 5 is an explanatory diagram of an image extraction process in the first camera.

The first camera 20 performs an extraction process on all parts of a human from the head to the foot, but herein, a foot portion which is important for the recognition of a moving direction of the extracted human is illustrated.

Herein, an arithmetic operation of differences between a background image (frame 1) and a human image (frame 2) is performed to extract a human, and thus a foot of the human is extracted from the shape of the extracted human. Then, a distance between the multifunction machine 1 and the human is calculated based on the position of the foot on the extracted image.

Furthermore, the background image may be an image which is captured in advance at the timing when the human is not present within the angle of the view of image capturing of the first camera 20. Alternatively, the background image may be an image in which stationary regions are joined together to be composed, from images of plural frames in which a moving human is captured.

Figure 6A:
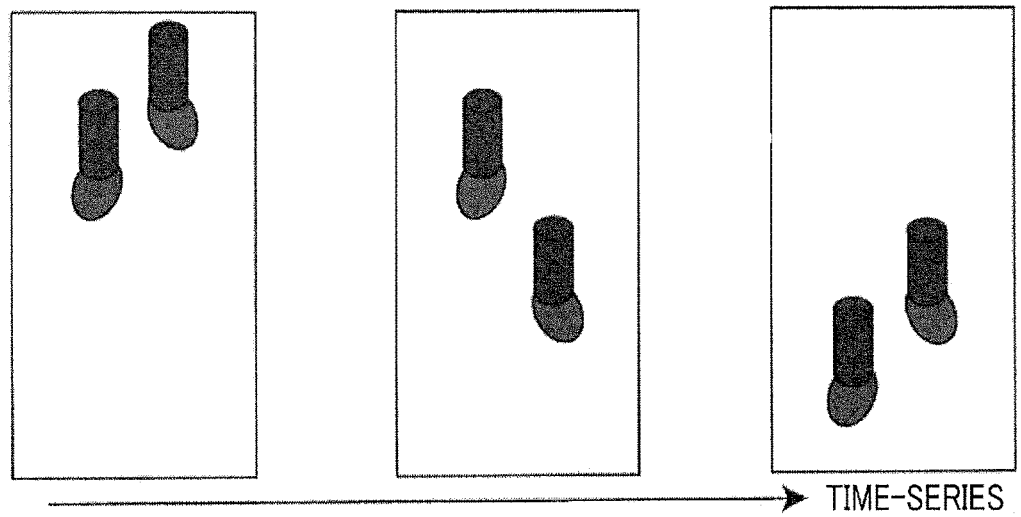
FIGS. 6A and 6B are explanatory diagrams of a process of calculating a moving direction of a human.
Figure 6B:
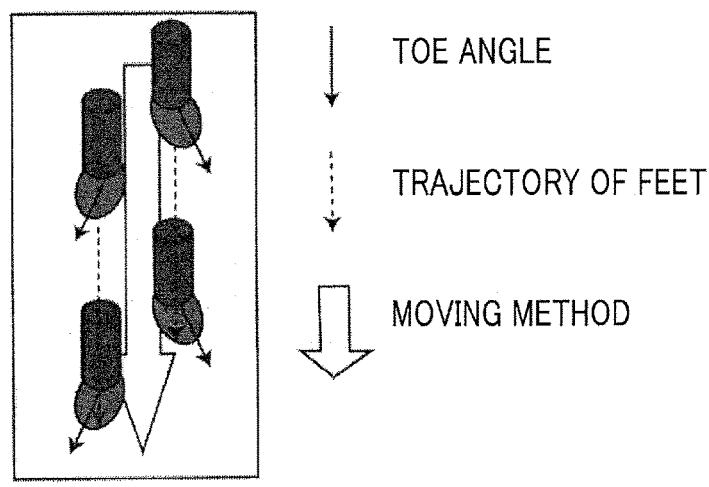

FIGS. 6A and 6B are explanatory diagrams of a process of calculating a moving direction of a human.

FIG. 6A illustrates plural time-series extracted images. All of the plural extracted images are images obtained by the difference arithmetic operation illustrated in FIG. 5.

FIG. 6B is a diagram illustrating the plural extracted images, shown in FIG. 6A, which overlap each other.

FIG. 6B illustrates toe angles and trajectories of feet.

Herein, a moving direction is detected from these toe angles and trajectories of feet. It is determined whether a human attempts to use the multifunction machine 1, based on a distance to the human and a moving direction of the human. When it is determined that an attempt to use the multifunction machine 1 is made, power is in turn supplied to the second camera 30, as described above with reference to FIG. 3 and FIG. 4.

Figure 7:
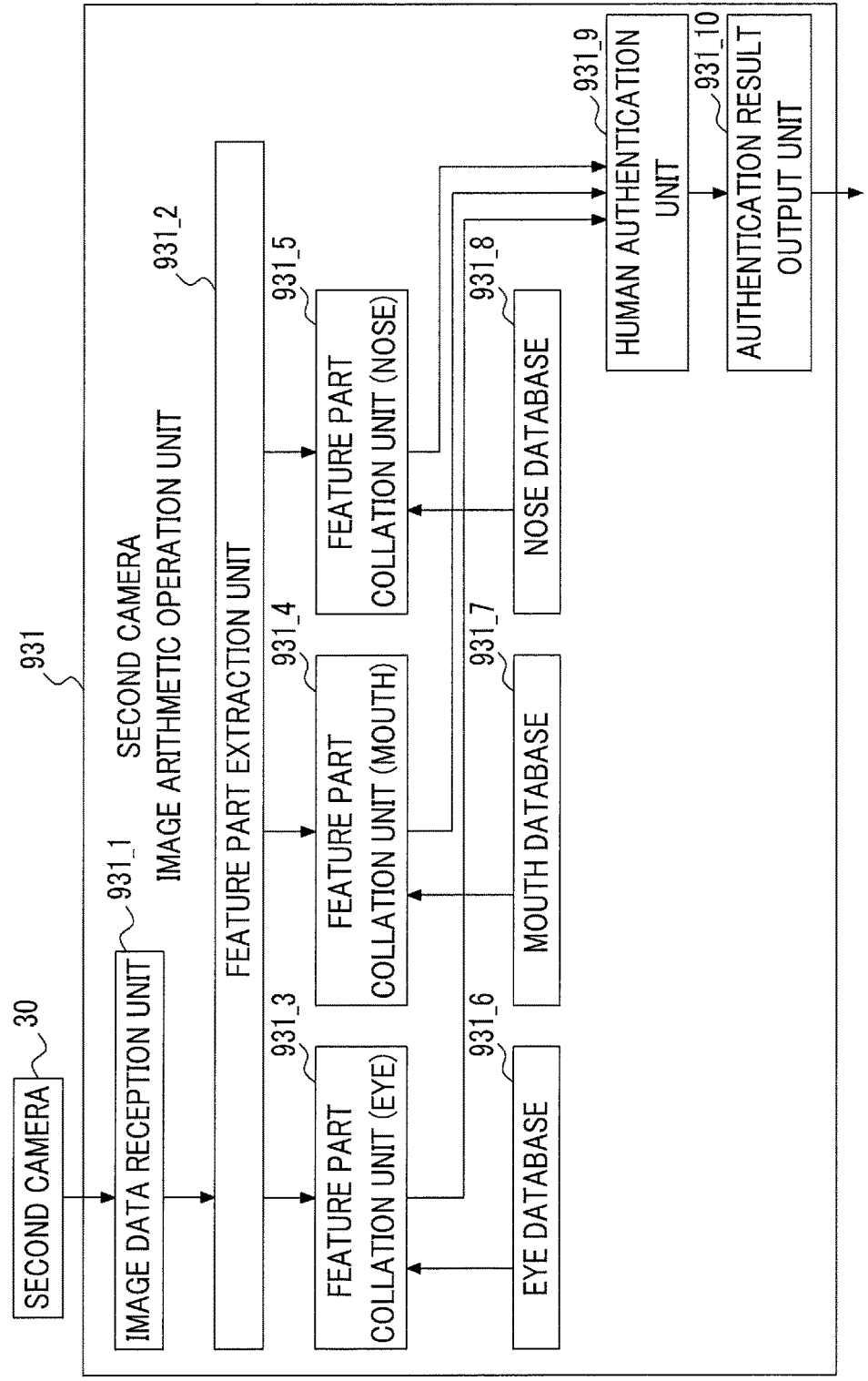
FIG. 7 is a block diagram illustrating an internal structure of a second camera image arithmetic operation unit shown as one block in FIG. 3.

FIG. 7 is a block diagram illustrating an internal structure of the second camera image arithmetic operation unit shown as one block in FIG. 3.

Image data generated by capturing a human's face using the second camera 30 is transmitted to the second camera image arithmetic operation unit 931 within the main controller 90 (see FIG. 3), and is received in an image data reception unit 931_1 of the second camera image arithmetic operation unit 931. The image data received in the image data reception unit 931_1 is input to a feature part extraction unit 931_2. The feature part extraction unit 931_2 extracts feature parts based on the input image data. Herein, specifically, features of the eyes, mouth, and nose of the captured human are extracted. The extraction of the features is a well-known technique, and the detailed description thereof will be omitted here.

In addition, the second camera image arithmetic operation unit 931 includes an eye database 931_6, a mouth database 931_7, and a nose database 931_8. Herein, features of the eyes, mouth, and nose of each human having the authority to use the multifunction machine 1 are registered.

The features of the eyes, the mouth, and the nose which are extracted by the feature part extraction unit 931_2 are input to a feature part collation unit (eye) 931_3, a feature part collation unit (mouth) 931_4, and a feature part collation unit (nose) 931_5, respectively. The feature part collation unit (eye) 931_3, the feature part collation unit (mouth) 931_4, and the feature part collation unit (nose) 931_5 collate the feature data of the eyes, the mouth, and the nose which are input from the feature part extraction unit 931_2 with feature data registered in the eye database 931_6, the mouth database 931_7, and the nose database 931_8 to search for consistent data.

The collation results of the feature part collation unit (eye) 931_3, the feature part collation unit (mouth) 931_4, and the feature part collation unit (nose) 931_5 are transmitted to a human authentication unit 931_9. The human authentication unit 931_9 authenticates whether a human is authorized to use the multifunction machine 1. The authentication results are output from an authentication result output unit 931_10.

The authentication results output from the authentication result output unit 931_10 are transmitted as the power-supply control signal c illustrated in FIG. 3 to the power supply device 80. When the authentication results are authentication results indicating that the human is authorized to use the multifunction machine 1, the power supply device 80 starts to supply power to the image reading unit 40 to the user interface 70 which are illustrated in FIG. 2 and brings the multifunction machine 1 into an enabled state.

Figure 8:
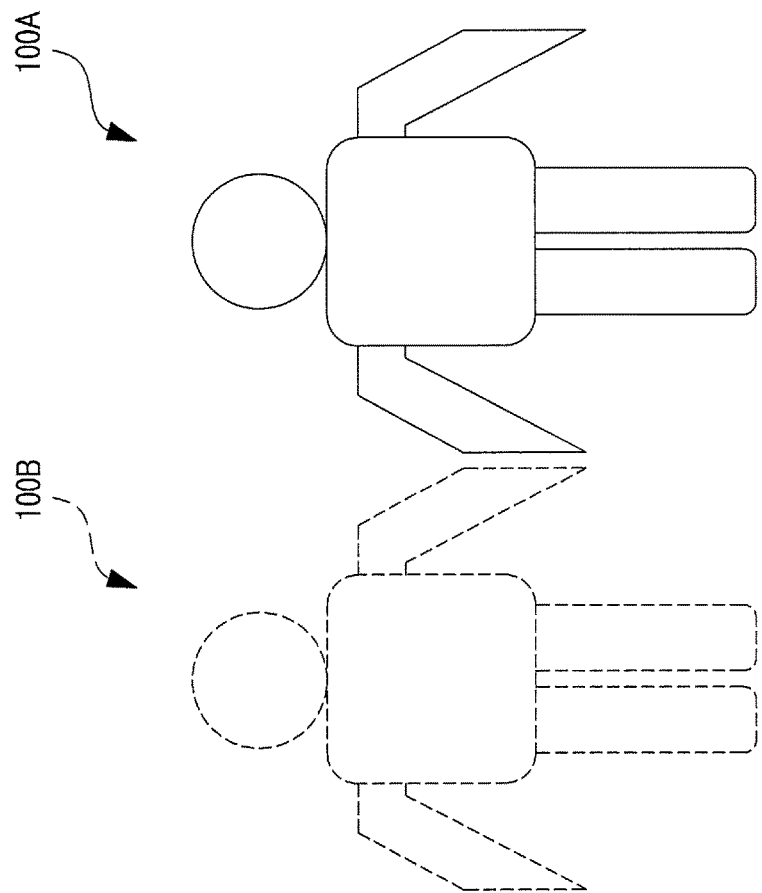
FIG. 8 is an explanatory diagram illustrating problems of a multifunction machine according to a comparative example.

FIG. 8 is an explanatory diagram illustrating problems of a multifunction machine according to a comparative example.

A contour and functions of the multifunction machine according to the comparative example are the same as the contour and functions of the multifunction machine according to the exemplary embodiment of the present invention which have been described so far, and the repeated description thereof will be omitted.

In addition, for the purpose of simplification, the multifunction machine according to the comparative example and components of the multifunction machine will be described by assigning the same reference numerals and signs as those assigned to the multifunction machine 1 and the components of the multifunction machine 1 according to the exemplary embodiment which have been described so far.

FIG. 8 is a schematic diagram of an image obtained by image capturing using the first camera 20 when only one human is present in front of the multifunction machine according to the comparative example.

In addition to an original image 100A of the human standing in front of the multifunction machine, another image 100B is further shown on the captured image. That is, herein, an image of one human appears doubly.

Figure 9:
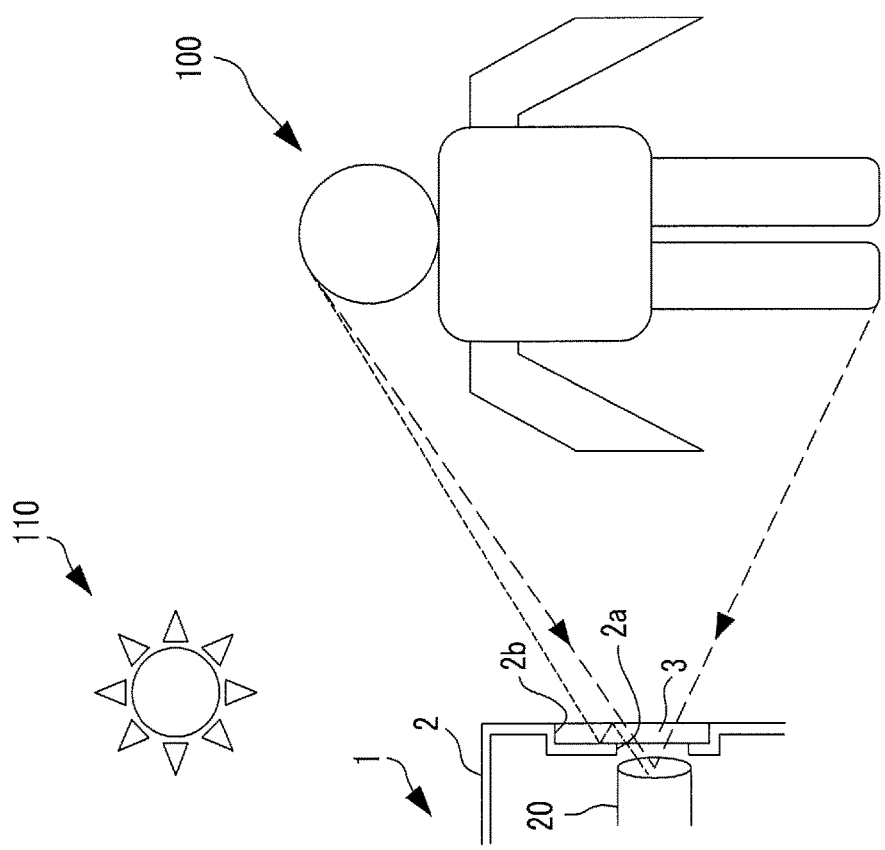
FIG. 9 is a schematic diagram illustrating a structure of a portion where a first camera is installed in the multifunction machine of the comparative example and a human approaching the multifunction machine.

FIG. 9 is a schematic diagram illustrating a structure of a portion where the first camera is installed in the multifunction machine of the comparative example and a human approaching the multifunction machine.

A housing 2 of the multifunction machine 1 is provided with an opening 2a facing a forward direction of the multifunction machine 1. The periphery of the opening 2a of the housing 2 has a recessed portion 2b which is recessed with one step. The first camera 20 is placed inside the housing 2 at the position where a lens is allowed to be looked from the opening 2a. In addition, the recessed portion 2b of the housing 2 is fitted with a filter 3 extending over the front surface of the lens of the first camera 20 to prevent a contact with the lens.

The first camera 20 requires viewing fields of approximately 70 degrees up and down, respectively, and herein, a fisheye lens similar to a spherical body is adopted in order to ensure such a wide-angle viewing field. On the other hand, the filter 3 has a flat plate shape, and is separated from the fisheye lens to be fixed to the housing 2.

Here, in a bright environment lighted by the sun 110, in addition to the image 100A (see FIG. 8), shown by a dashed line in FIG. 9, which is based on light passing through an original optical path for capturing an image of a human 100 using the first camera 20, the image 100B (see FIG. 8), shown by a dotted line in FIG. 9, which is based on light passing through an optical path, which passes through the filter 3, is reflected by a surface of the housing 2, is reflected again by a surface of the filter 3 and is incident on the first camera 20, may appear. When such an originally unnecessary image appears on the captured image obtained by the first camera 20, there is a concern that the detection accuracy of a distance to the human and a moving direction of the human may be decreased.

Figure 10:
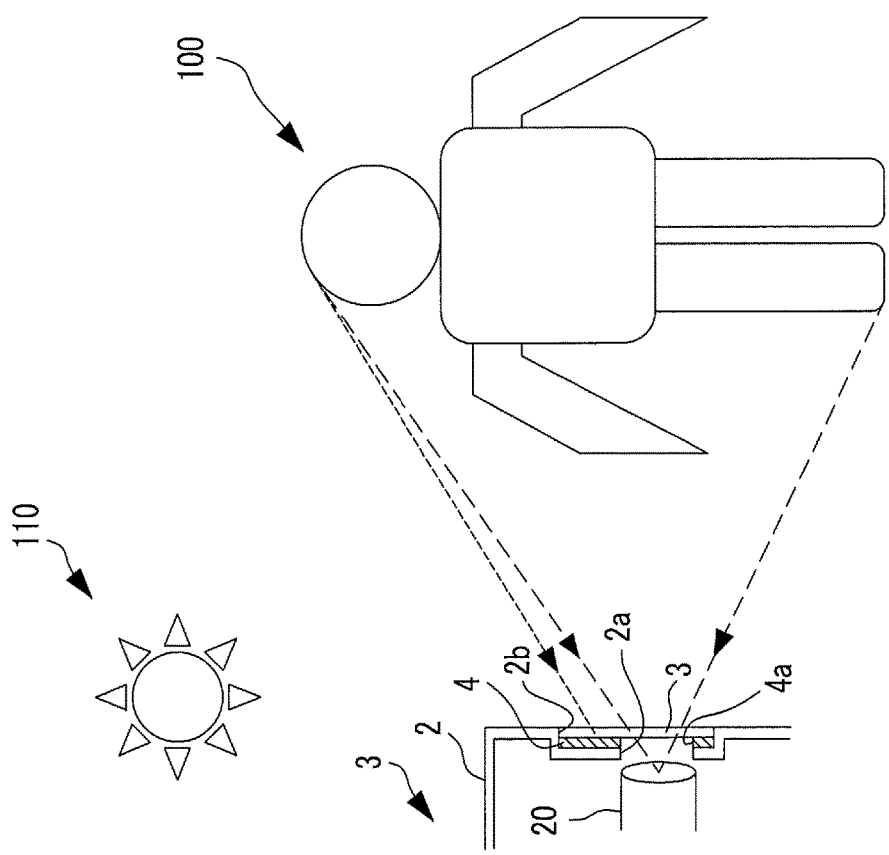
FIG. 10 is a schematic diagram illustrating a structure of a portion where the first camera is installed in the multifunction machine according to this exemplary embodiment and a human approaching the multifunction machine.

FIG. 10 is a schematic diagram illustrating a structure of the portion where the first camera is installed in the multifunction machine according to this exemplary embodiment and a human approaching the multifunction machine.

Figure 11:
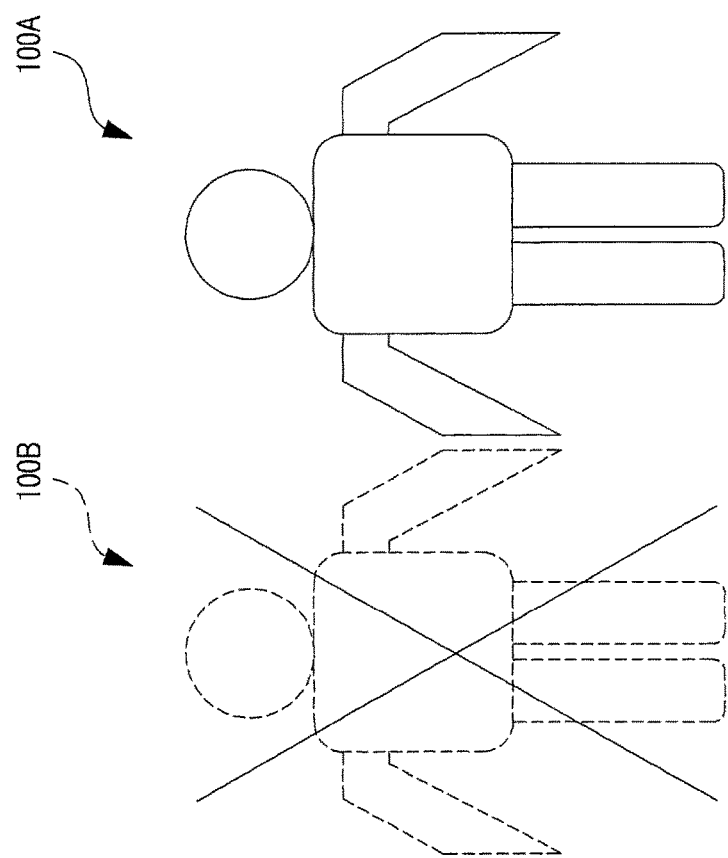
FIG. 11 is a schematic diagram illustrating a captured image obtained by the first camera of the multifunction machine according to this exemplary embodiment.

In addition, FIG. 11 is a schematic diagram illustrating a captured image obtained by the first camera of the multifunction machine according to this exemplary embodiment.

In FIG. 10 and FIG. 11, the same components as those in the comparative examples shown in FIG. 8 and FIG. 9 are denoted by the same reference numerals and signs as those assigned to FIG. 8 and FIG. 9, and differences with the comparative examples will be described below.

As illustrated in FIG. 10, in a case of the multifunction machine according to this exemplary embodiment, a black sheet 4 is placed in the recessed portion 2b of the housing 2 so as to be sandwiched between the housing 2 and the filter 3. The black sheet 4 is provided with a hole 4a with respect to a portion of the opening 2a of the housing 2 so as not to interfere with image capturing by the first camera 20.

In this case, light having traveled along an optical path shown by a dotted line in FIG. 10 is absorbed into the black sheet 4. Accordingly, as illustrated in FIG. 11, the image 100B, which is originally unnecessary, appearing on the captured image of the comparative example disappears from the captured image, and thus the distance to the human and the moving direction of the human may be detected with a high level of accuracy. The black sheet 4 corresponds to an example of a reflection reducing sheet described in the present invention.

FIGS. 12A to 12E are front views of a portion of the first camera of the multifunction machine.

Figure 12A:
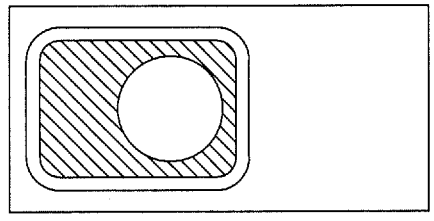
FIGS. 12A to 12E are front views of a portion of the first camera of the multifunction machine.
Figure 12B:
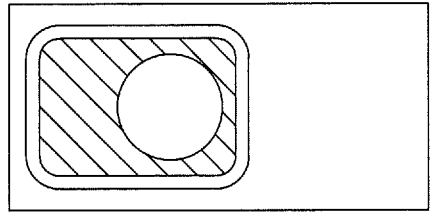
Figure 12C:
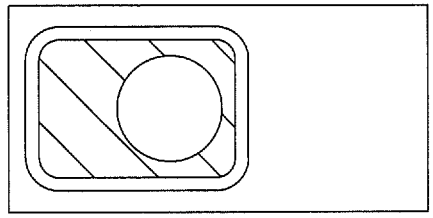
Figure 12D:
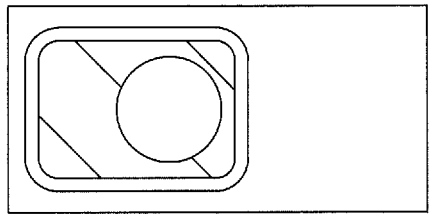
Figure 12E:
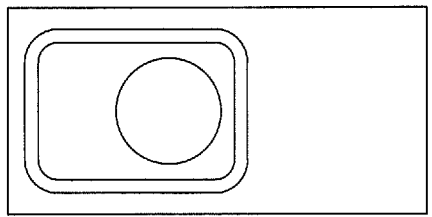

FIGS. 12A to 12D illustrate cases where sheets having different reflectances are placed, and FIG. 12E illustrates a case where a sheet is not present (corresponds to the comparative example shown in FIG. 9). Specifically, FIGS. 12A to 12D illustrate cases where sheets having reflectances of 80%, 60%, 40%, and 20% are placed.

Herein, the degree of influence of an unnecessary image such as the image 100B illustrated in FIG. 8 on detection accuracy is examined by variously changing an illuminance (lx) of the environment using sheets having various reflectances as illustrated in FIGS. 12A to 12E.

Figure 13:
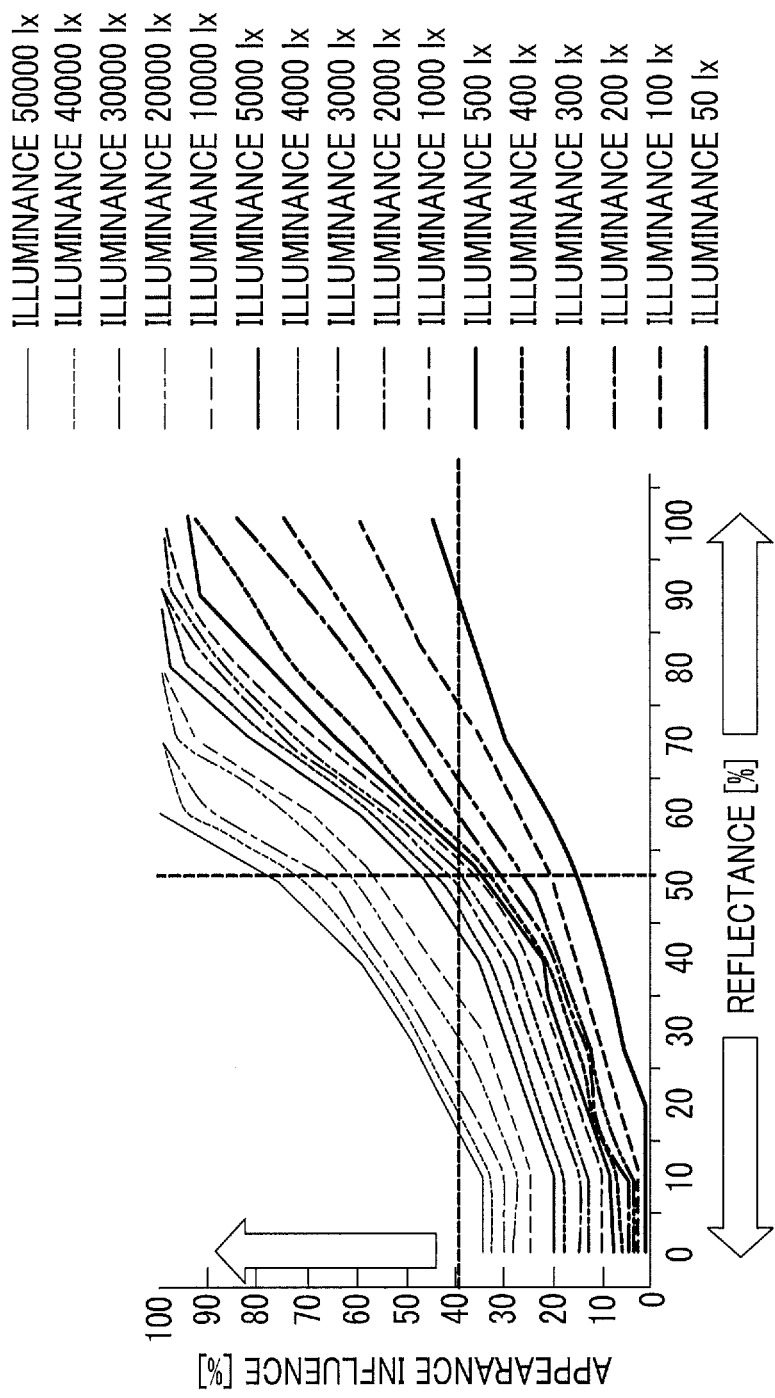
FIG. 13 is a diagram illustrating a relationship between a reflectance of a sheet and an appearance influence [%] of an unnecessary image, for each illuminance (lx) of an environment.

FIG. 13 is a diagram illustrating a relationship between a reflectance of a sheet and an appearance influence [%] of an unnecessary image, for each illuminance (lx) of an environment.

Here, the appearance influence [%] shows influence with respect to the first camera image arithmetic operation unit and the second camera image arithmetic operation unit which are illustrated in FIG. 3.

As the appearance influence increases, the first camera arithmetic operation unit and the second camera arithmetic operation unit are set to be in a state where a multiple image is detected, and thus a real state (appearance) may not be detected, which results in a state such as so-called defocusing. Consequently, in order to confirm the degree of appearance influence, the proposer set a target value (1) in the first camera arithmetic operation unit and a target value (2) in the second camera arithmetic operation unit as follows, and performed an evaluation.

(detection distance between multifunction machine user and multifunction machine)=350 mm±100 mm     1

(degree of authentication of multifunction machine user)=95% or more     2

As a result, it is found that the appearance influence has to be set to equal to or less than 40% in order for both 1 and 2 to accomplish the target values. In addition, the setting of the target value is a state where the majority of users may use the multifunction machine without stress, that is, a state where the multifunction machine is started up (body sensory waiting time is zero) at the same timing when a user reaches in front of the multifunction machine (position where an operation panel of the multifunction machine is most easily operated) and where security may be automatically realized by performing face authentication without security consciousness. Therefore, when target values other than the above-described states are desired to be set (for example, a higher level of accuracy and a lower level of accuracy), the target value of the appearance influence changes.

High Level of Accuracy: the appearance influence is required to be further lowered.

Low Level of Accuracy: the appearance influence may be further increased.

As an illuminance (lx) of the environment increases, the appearance influence is increased, and as a reflectance of a sheet increases, the appearance influence is increased. When the appearance influence is equal to or less than 40%, the influence on detection accuracy is small, and thus it is found that a sufficient detection accuracy is obtained. From this, it may be seen that the reflectance of the sheet is preferably equal to or less than 50%.

In addition, herein, a sheet for reducing reflectance is placed between the housing 2 and the filter 3 in a sandwiched manner. However, in the present invention, means for reducing reflectance is not required to be a sheet, and the surface of the recessed portion 2b of the housing 2 or the rear surface of the filter 3 may be coated with, for example, paint for antireflection. In the present invention, such a member or paint or the like for antireflection, which is present between the surface of the housing 2 and the filter 3, are collectively referred to as a reflection reducing material.

Herein, the multifunction machine having both a copying function and a FAX function has been described. However, the processing apparatus of the present invention is not required to be a multifunction machine, and may be, for example, a copy machine having only a copying function or may be a FAX machine having only a FAX function.

Furthermore, the processing apparatus of the present invention is not limited to a copying function or a FAX function, and may be an apparatus that executes a process according to an operator's operation and is not an apparatus of which the process contents are limited.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A processing apparatus that receives an operation and executes a process according to the operation, the processing apparatus comprising:
    a housing that is provided with an opening facing a forward direction;
    a camera that causes a lens to be looked from the opening to generate a captured image;
    a filter, for preventing a contact with the lens, that extends over a front surface of the lens outside of the camera and is placed with interposing a reflection reducing material between the filter and the housing, wherein the reflection reducing material is also disposed to be outside the camera and between the filter and the camera lens, wherein the housing is further provided with an outermost surface and a recessed surface positioned closer than the outermost surface to the opening, the outermost surface and the recessed surface both facing in a direction away from the camera, and the reflection reducing material is disposed between the outermost surface and the recessed surface of the housing in a state in which the reflection reducing material is sandwiched between and contacting the recessed surface and the filter; and
    a control unit that analyzes a human within an angle of a view of image capturing based on the captured image generated by the camera, using analysis results as one basis determines whether to cause the processing apparatus to transition to an enabled state, and causes the processing apparatus to transition to an enabled state when the determination of the transition to an enabled state is made.

2. The processing apparatus according to claim 1, wherein the reflection reducing material is a reflection reducing sheet placed between the housing and the filter.

3. The processing apparatus according to claim 2, wherein the reflection reducing material has a reflectance of equal to or less than 50% with respect to visible light.

4. The processing apparatus according to claim 1, wherein the reflection reducing material has a reflectance of equal to or less than 50% with respect to visible light.

5. The processing apparatus according to claim 1, wherein the reflection reducing material is paint for antireflection.

6. The processing apparatus according to claim 1, wherein the reflection reducing material is provided with a hole facing the forward direction, the hole of the reflection reducing material corresponding to the opening of the housing.

* * * * *